(12) United States Patent
Shepperson

(10) Patent No.: US 6,895,928 B2
(45) Date of Patent: May 24, 2005

(54) INTERNAL COMBUSTION ENGINE IDLE CONTROL

(75) Inventor: Adam Peter Shepperson, London (GB)

(73) Assignee: Visteon Global Technologies, Inc., Van Buren Township, MI (US)

(*) Notice: Subject to any disclaimer, the term of this patent is extended or adjusted under 35 U.S.C. 154(b) by 0 days.

(21) Appl. No.: 10/777,931

(22) Filed: Feb. 12, 2004

(65) Prior Publication Data

US 2004/0221833 A1 Nov. 11, 2004

(30) Foreign Application Priority Data

Feb. 12, 2003 (GB) .............................................. 0303286

(51) Int. Cl.$^7$ .............................................. F02D 41/16
(52) U.S. Cl. .............................. 123/339.11; 123/339.17; 123/339.18
(58) Field of Search ........................ 123/339.11, 339.16, 123/339.17, 339.18, 339.19, 339.2, 339.21, 339.23; 701/110

(56) References Cited

U.S. PATENT DOCUMENTS

| 4,617,890 A | 10/1986 | Kobayashi et al. .... 123/339.17 |
| 4,633,093 A | 12/1986 | Otobe et al. ............... 290/40 R |
| 5,136,997 A | 8/1992 | Takahashi et al. ...... 123/339.21 |
| 5,153,446 A | * 10/1992 | Shimomura ............ 123/339.23 |
| 5,265,571 A | * 11/1993 | Sodeno .................. 123/339.17 |
| 5,375,574 A | 12/1994 | Tomisawa et al. ..... 123/339.22 |
| 5,666,917 A | * 9/1997 | Fraser et al. ........... 123/339.11 |
| 5,701,867 A | * 12/1997 | Mizutani et al. ....... 123/339.16 |
| 5,712,786 A | 1/1998 | Ueda .......................... 701/110 |
| 2003/0172904 A1 | * 9/2003 | Kustosch ............... 123/339.21 |

* cited by examiner

Primary Examiner—Tony M. Argenbright
(74) Attorney, Agent, or Firm—Brinks Hofer Gilson & Lione

(57) ABSTRACT

The present invention relate to idle control in an internal combustion engine and particularly to the control of the air supply to the engine during engine idling. An engine control unit (ECU) monitors the operation of ancillary consumer units to calculate an engine demand depending at least partly on the operation of these units. The ECU also monitors the engine idling speed to determine if the expected engine demand can be met at this engine idling speed. When the engine demand exceeds that available at the idling speed, the ECU determines a desired degree of opening of an air inlet valve to meet the expected engine demand. The ECU is arranged first to open the air inlet valve to a position at which the steady state airflow would exceed that necessary to meet the expected engine demand, and then closes the air inlet valve towards the calculated desired opening.

8 Claims, 3 Drawing Sheets

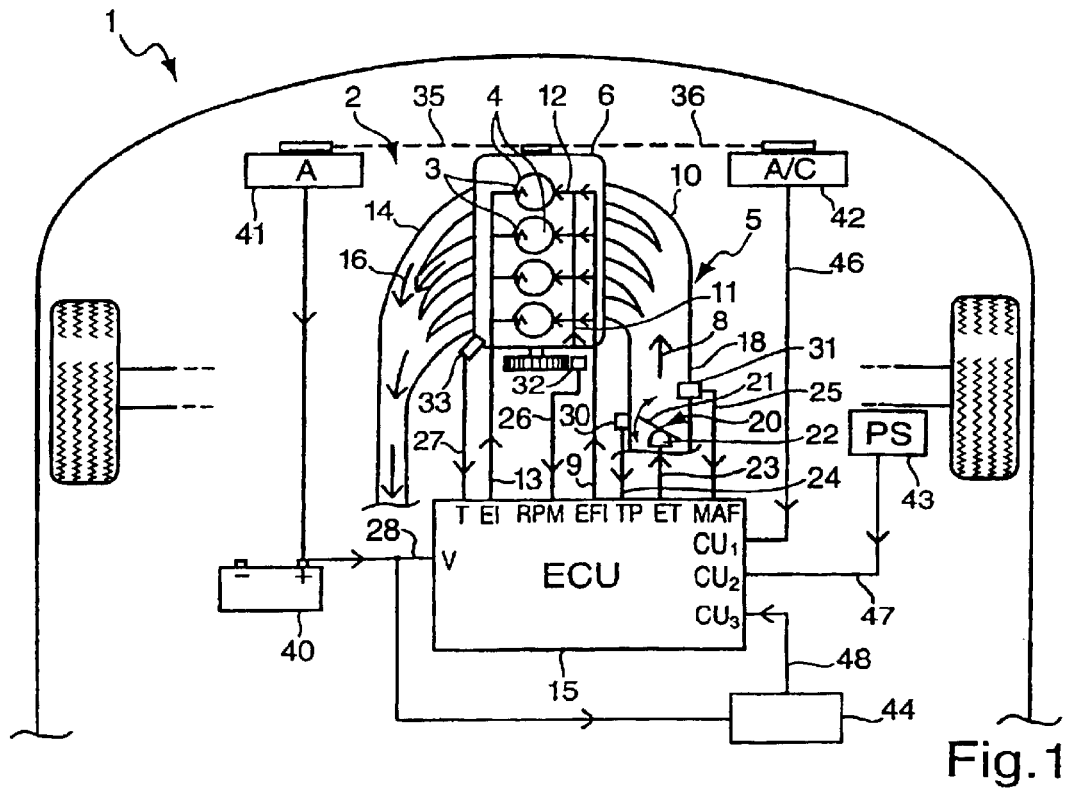
Fig.1
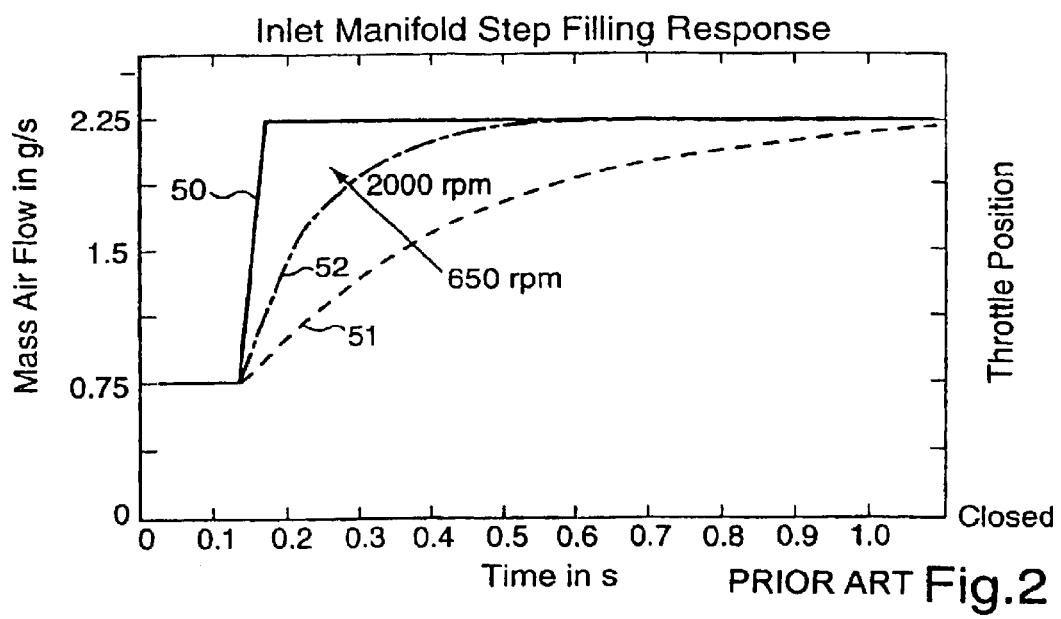
PRIOR ART Fig.2

INTERNAL COMBUSTION ENGINE IDLE CONTROL

BACKGROUND OF THE INVENTION

1. Field of the Invention

The present invention relates to idle control in an internal combustion engine, and particularly the control of the air supply to the engine during engine idling.

2. Related Art

In order to improve engine torque at high engine speeds, automotive internal combustion engines have been developed which have a larger air intake manifold volume for a given engine displacement. At the same time, engine accessories and other ancillary consumer units in motor vehicles are constantly being improved and in some cases converted from being mechanically driven to being electrically driven. This has the effect of lowering the idle load placed on the engine, and hence the minimum desirable engine speed.

It therefore becomes more important that an engine should respond quickly to any sudden increase in engine load at idle speeds, for example owing to a sudden increase in alternator demand or power steering demand, in order to avoid stalling of the engine. However, a large intake manifold volume to engine displacement ratio and a lower idling speed both reduce the speed of response to changes in inlet airflow.

BRIEF SUMMARY OF THE INVENTION

It is an object of the present invention to provide an air inlet system for a motor vehicle that addresses these issues.

According to the invention, there is provided a motor vehicle, comprising an internal combustion engine, an air inlet passageway for aspirating the engine, an air inlet valve positioned in the passageway for controlling air flow through the passageway to the engine, a valve actuator for opening and closing the air inlet valve, at least one ancillary consumer unit powered by the engine, at least one engine sensor including an engine speed sensor, and an engine control unit that is operatively connected to the valve actuator, ancillary consumer unit(s) and engine speed sensor in order to control engine operation, the engine control unit being arranged during idling of the engine:
(a) to monitor the operation of the ancillary consumer unit(s) and to calculate an engine demand depending at least partly on the operation of the ancillary unit(s);
(b) to monitor the engine idling speed and to determine if the expected engine demand can be met at said engine speed;
(c) and when the engine demand exceeds that available at said engine idling speed, to determine a desired degree of opening of the air inlet valve to meet the expected engine demand;
wherein when the engine demand exceeds that available at said engine idling speed, the engine control unit is arranged to open the air inlet valve to a position at which the steady state airflow would exceed that necessary to meet the expected engine demand, and to calculate an exponential decay factor and then to close the air inlet valve according to said decay factor towards said desired opening so that the rate at which the engine control unit doses the air inlet valve varies in proportion with the monitored engine speed.

The invention permits the air inlet valve to be operated in such a way that the air flow is increased more rapidly to the engine than would be the case if the air inlet valve were moved only to the position which would result in the desired steady state air flow. The additional engine demand can therefore be met more quickly by the engine.

Ancillary units may be powered in different ways, as long as use of these units ultimately places a load on the engine. For example, ancillary units may be powered directly by the engine, such as mechanically via a pulley driven by an engine crankshaft, or indirectly, such as electrically via a battery that is charged via an engine-driven alternator.

The invention is applicable to both spark ignition engines, particularly direct or indirect injection engine and also to compression ignition engines.

Also according to the invention, there is provided a method of controlling an internal combustion engine in a motor vehicle, the vehicle comprising an air inlet passageway, an air inlet valve positioned in the passageway, a valve actuator, at least one ancillary consumer unit, at least one engine sensor including an engine speed sensor, and an engine control unit that is operatively connected to the valve actuator, ancillary consumer unit(s) and engine speed sensor, the method comprising the steps of:
i) aspirating the engine through the air inlet passageway while running the engine at an idling speed;
ii) using the air inlet valve to control the air flow through the passageway to the engine;
iii) using the valve actuator to control engine aspiration by opening and closing the air inlet valve;
iv) powering the ancillary consumer unit(s) either directly or indirectly by the engine;
v) using the engine control unit to monitor the operation of the ancillary unit(s) and to calculate an engine demand depending at least partly on the operation of the ancillary unit(s);
vi) using the engine control unit to monitor the engine idling speed and to determine if the expected engine demand can be met at said engine speed;
vii) when the engine demand exceeds that available at said engine idling speed, using the engine control unit to determine a desired degree of opening of the air inlet valve to meet the expected engine demand; and
viii) when the engine demand exceeds that available at said engine idling speed, using the engine control unit to open the air inlet valve to a position at which the steady state airflow would exceed that necessary to meet the expected engine demand, and then to close the air inlet valve towards said desired degree of opening; and
ix) using the engine control unit to calculate an exponential decay factor and then in step viii) closing the air inlet valve according to said decay factor so that the rate at which the engine control unit closes the air inlet valve varies in proportion with the monitored engine speed.

During step viii), the air inlet valve may then be progressively dosed until the available engine power matches the desired engine power.

The closing of the air inlet valve according to the exponential decay factor is useful because the natural damping effect to changes in air flow through the air inlet will be lower at higher air flow speeds, and therefore also at higher engine speeds.

For the same reason, it may also be desirable if the degree to which the engine control unit initially opens the air inlet valve varies inversely with the monitored engine speed. The air inlet valve therefore needs to be opened less at higher air flow and engine speeds in order to achieve a rapid and optimal increase in air flow up to the desired level.

It is particularly helpful if the airflow is allowed to temporarily overshoot that necessary to meet the expected engine demand. This results in a quicker initial rise in the air flow volume towards the desired level.

However, this may also result in the engine power also temporarily overshooting that necessary to meet the demand from the engine ancillary consumers. Therefore, when the engine is a spark ignition engine, the method may include the steps of:

using the engine control unit to initiate ignition with engine sparks at a desired engine spark angle; and using the engine control unit to steady engine power during the period when the air flow temporarily overshoots by varying the engine spark angle.

Alternatively or additionally, the engine control unit may also compensate for a temporary overshot in engine speed by temporarily reducing the amount of injected fuel or the timing of injection events.

Thus, the engine power can be reduced below that which would otherwise prevail if the engine spark angle during the period of air flow overshoot were not varied.

BRIEF DESCRIPTION OF THE DRAWINGS

The invention will now be further described, by way of example only, and with reference to the accompanying drawings, in which:

FIG. 1 schematically shows a part of a motor vehicle having an internal combustion engine with an air inlet valve controlled by an engine control unit at least partly in response to use of ancillary power units, according to the invention;

FIG. 2 is a plot of mass air flow against time for the engine of FIG. 1, showing how a step change in air valve position results in a gradual rise in mass airflow towards a higher steady state level;

DETAILED DESCRIPTION OF THE INVENTION

Figure 3:
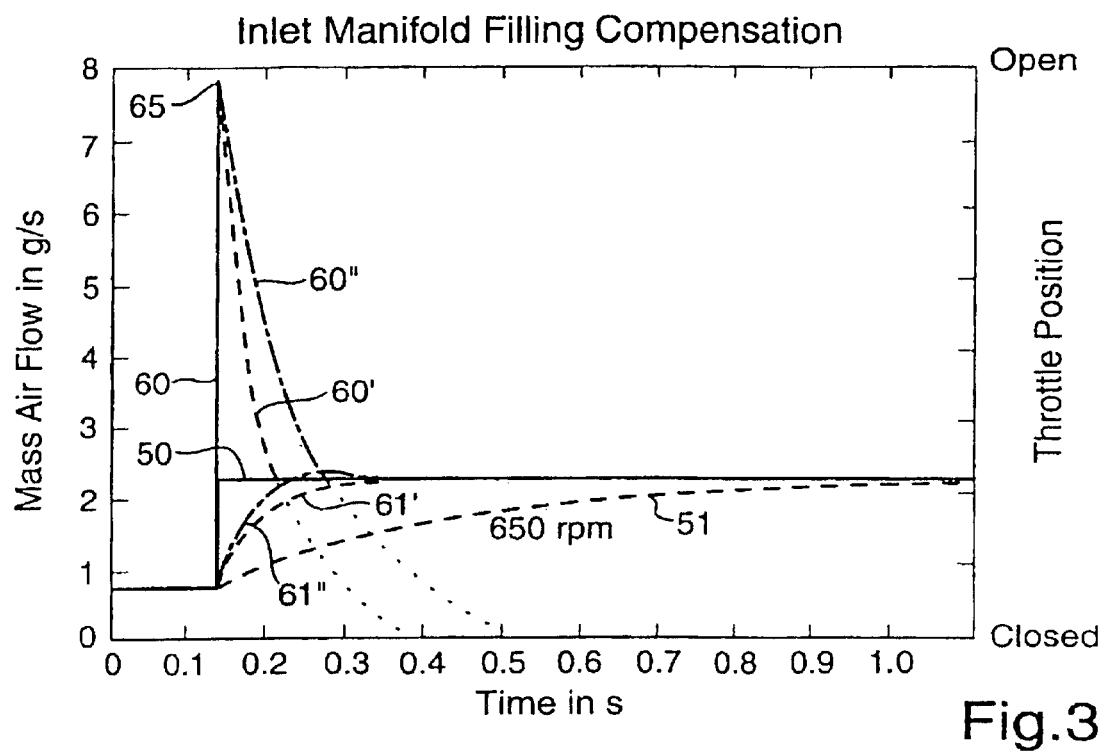
FIGS. 3 and 4 are a plots of mass air flow against time similar to that of FIG. 2, but showing how the engine control unit can control the air valve position to shorten the time it takes for mass air flow to reach the higher steady state level.

Referring now to FIG. 1, shown therein is part of a motor vehicle 1, for example a car, with an engine 2. In this example, the engine 2 is a spark ignition engine, although the invention in its broadest scope is also applicable to compression ignition engines. The engine 2 has a number of cylinders 4, each with a spark plug 3, situated above a crank case 6. The engine 2 also has an air inlet system 5 that supplies inlet air 8 to the cylinders 4 via an inlet manifold 10.

Fuel 11 may be supplied to each of the cylinders 4 via a fuel injector 12. The fuel injection may either direct injection or indirect injection. Each fuel injector 12 is controlled by an electronic fuel injection (EFI) control signal received along a control signal line 9 from a microprocessor-based engine control unit (ECU) 15. Similarly, each spark plug 3 is energized under the control of an electronic ignition signal (EI) sent from the ECU 15 along an ignition control signal line 13.

It should be noted that although the ECU 15 may be a single system unit, this may more conveniently be formed from a number of discrete systems, such as an engine management system, electronic ignition system, climate control system, etc.

The engine 2 also has an exhaust manifold 14 by which exhaust gases 16 leave the cylinders 4.

Inlet air 8 reaches the inlet manifold 10 through an air inlet passageway 18 inside of which is situated an air inlet or throttle valve assembly 20. The assembly includes a butterfly valve 21 that is driven by an electric motor 22 upon receipt of an electronic throttle control signal (ET) received along a control signal line 23 from the ECU 15. The throttle valve assembly 20 also includes a throttle valve position sensor 30 which communicates the throttle position (TP) to the ECU 15 along a signal line 24.

In addition to the TP signal, the ECU 15 also receives from the engine 2, along corresponding signal lines 25-27, a number of other signals indicative of various engine operating parameters. Among these are: a mass air flow (MAF) signal from a mass air flow sensor 31 in the air passageway 8 downstream of the throttle valve assembly 20; an engine speed (RPM) signal from an engine speed sensor 32; and an engine temperature (T) signal from an engine temperature sensor 33. The ECU 15 also monitors the voltage (V) of a vehicle electrical system comprising a battery 40 and alternator (A) 41 via a line 28 connected to the battery 40. The ECU 15 then uses the sensors 30–33 to monitor engine operation, both during idling and active operation of the vehicle 1.

The ECU 15 controls engine operation including idling speed via the EFI sent along control signal line 9 and the TP signal sent along control signal line 23.

In the example shown in FIG. 1, the motor vehicle 1 has a number of ancillary consumer units powered directly by the engine. These include the alternator 41, and air conditioning (A/C) compressor 42, each of which is driven via a pulley and belt arrangement 35, 36, and a hydraulically powered power steering (PS) system 43. The motor vehicle also has a number of ancillary consumer units that are indirectly powered via the vehicle electrical system 40, 41, such as an electric heated window 44.

The alternator 41 will automatically place an additional load on the engine 2 when the battery 40 is recharging, and the battery will detect this from a drop in the electrically system voltage (V). Alternatively, the ECU 15 may monitor the total current drawn from the battery 40 or receive directly from the alternator 41 a signal indicative of the alternator load. The air conditioning compressor 42, power steering system 43 and electrically heated window 44 will be under driver control, and so the ECU 15 receives from these ancillary devices 42–44, consumer unit signals ($CU_1$, $CU_2$ and $CU_3$), along corresponding signal lines 46–48, indicative of the usage of these ancillary consumer units.

When any of the ancillary consumer units 41–44 is activated, an additional load will be placed on the engine 2. For reasons of good fuel economy and low noise, the engine idling speed will normally be set as low as possible, however, this runs the risk of stalling the engine if the engine cannot deliver the increased engine power required by the ancillary units 41–44.

FIG. 2 graphically shows the performance of a prior art engine aspiration system, for an engine similar to that of FIG. 1, having a 2 liter engine and a 6 liter air volume in the manifold and air passageway downstream of the inlet valve 21. The solid line 50 is the throttle position against time in seconds (s) and the two dashed lines 51, 52 show, respectively at 650 rpm and 2000 rpm, the air mass flow in grams per second (g/s) against time in seconds (s). In this example, the engine demand initially requires an air mass flow of 0.75 g/s, and this is met at a constant throttle position. At time=0.15 s, there is a sudden increase in the required engine demand, and there is a step increase in the throttle position.

However, owing to the damping effect of the volume of air inside the air passageway 8 and manifold 10, there is a time delay before the air mass flow reaches a desired level of 2.25 g/s.

The step response shown in FIG. 2 is typical of the required airflow required to offset the load due to a mechanically driven air conditioning compressor 42. It can be seen from dashed line 51 that to provide a smooth idle engine speed the air condition compressor 42 needs to wait approximately 1.1 s at 650 rpm before engaged. During this time, the engine speed and hence available power and torque will increase to meet the expected demand. Even at 2000 rpm, as can be seen from the dashed line 52, the delay is about 0.5 s. Engine loads, such as the power steering system 43, cannot be delayed, hence the time between a load being requested and sufficient mass airflow becoming available should be as short as possible.

Figure 4:
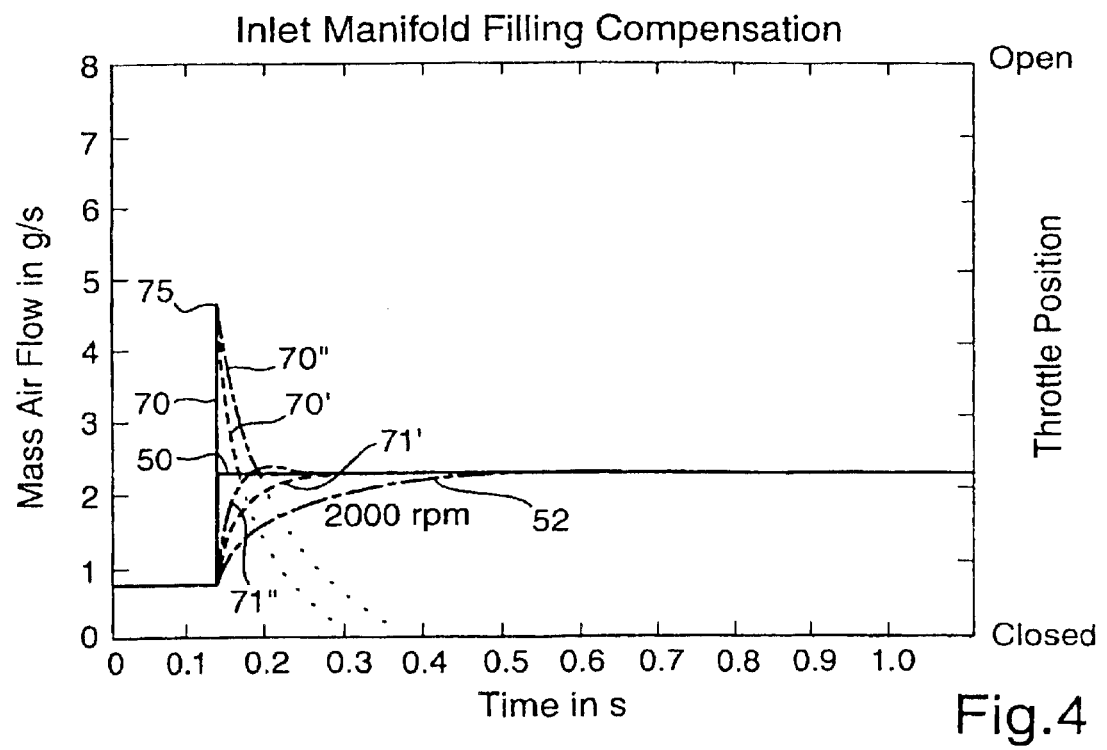

FIGS. 3 and 4 show, respectively, the improvement afforded by the invention at, respectively, 650 rpm and 2000 rpm. For comparison, each of these also shows the corresponding plots of throttle position 50 and air mass flow 51,52 from FIG. 2.

As can be seen in FIG. 3 from solid line 60 representing throttle position, the engine control unit 15 is arranged first to calculate a maximum throttle position 65 and then to open the air inlet valve 21 to towards this position 65. In FIG. 3, the maximum throttle position 65 is nearly fully open and would, if maintained, result in a steady state airflow that would greatly exceed that necessary to meet the expected engine demand. The ECU 15 then calculates an exponential decay factor and applies this to the throttle position to close the air inlet valve 21 towards this desired opening, which corresponds to the steady state air flow of 2.25 g/s.

Two alternative possibilities are shown in FIG. 3 for the dosing of the throttle valve 21. Following point 65, the throttle position may fall at a relatively rapid rate, as shown by dashed line 60' or at a relatively slower rate, as shown by intermittently dashed line 60". In the former case, the mass air flow quickly reaches the desired level of 2.25 g/s after about 0.2 s, as indicated by dashed line 61'. In the latter case, the air mass flow even more quickly reaches the desired level after about 0.08 s, as indicated by intermittently dashed line 61", but then overshoots this level, before settling down at 2.25 g/s once the throttle position has been moved fully back to the desired position. In the latter case the ECU 15 is preferably used to compensate for a corresponding overshoot in engine power, for example, by shifting in time the spark and/or injection events in the cylinders 4.

FIG. 4 shows similar plots to those of FIG. 3, but for the engine speed 2000 rpm. Because there is less damping in the air volume downstream of the throttle valve 21 at higher engine speeds, the throttle position does not need to move as far beyond the desired point as at lower engine speeds. Here the maximum throttle opening 75 is mid-way between fully open and closed. The throttle position then returns more rapidly than as shown in FIG. 3, either at a rate 70' which allows the air mass flow to approach the desired level smoothly at 71') with no overshooting within about 0.13 s, or more rapidly at a rate 70" within about 0.05 s, but with some overshooting as seen by 71". Again, the ECU 15 may compensate for any overshoot in engine power.

As can be seen from a comparison of FIGS. 3 and 4, the calculated decay rates 60', 60" and 70', 70" vary in proportion with the monitored engine speed, and the maximum throttle opening 65, 75 varies inversely with the monitored engine speed.

The maximum throttle position and decay rates can be calculated by the ECU 15 in various ways, in order to achieve a quick and relatively smooth rise and transition of mass air flow towards the desired level.

In this example, this is done by first adding a derivative term with an exponential decay based on the manifold/inlet filling time constant.

The calculation uses the derivative controller $$G_D(z) = \frac{2K_D(1-z^{-1}) - z^{-1}G_D(z)(T-2\tau)}{T+2\tau}, \quad (1)$$

where:
$K_D$ is the derivative gain
T is the algorithm period
$\tau$ is the derivative decay time constant
Equation (1) is obtained by substituting $$s \Rightarrow \frac{2}{T_{IAC}}\left(\frac{1-z^{-1}}{1+z^{-1}}\right)$$

into the analogue filtered transform $$G_D(s) = K_D \frac{s}{1+\tau s}.$$

The ECU 15 uses equation (1) in addition to the standard load rejection air flow. The derivative time constant is set at the fastest stable point. In this example, the ECU 15 has a calculation cycle time of 30 ms, and so the time constant is set to be 33% higher than this, at 40 ms. To prevent damage to the inlet air actuator 22 by being overdriven, this time constant could be slowed, with a corresponding reduction in gain.

The manifold filling is a function of engine speed and load. Hence, to ensure the control action remains in the stable operating region the derivative gain is also made a function of engine speed and load, thus exploiting the natural damping/frequency property of the manifold/inlet 10,18.

Using this, it is possible to achieve the response shown in FIGS. 3 and 4, where the combined inlet air flow has improved the step response from approximately 1.1 s to less than 0.5 s seconds for an idle engine speed at 650 rpm. It should be noted that this is equivalent to the standard load rejection step response at approximately 2000 rpm, as shown in FIG. 2.

Figure 5:
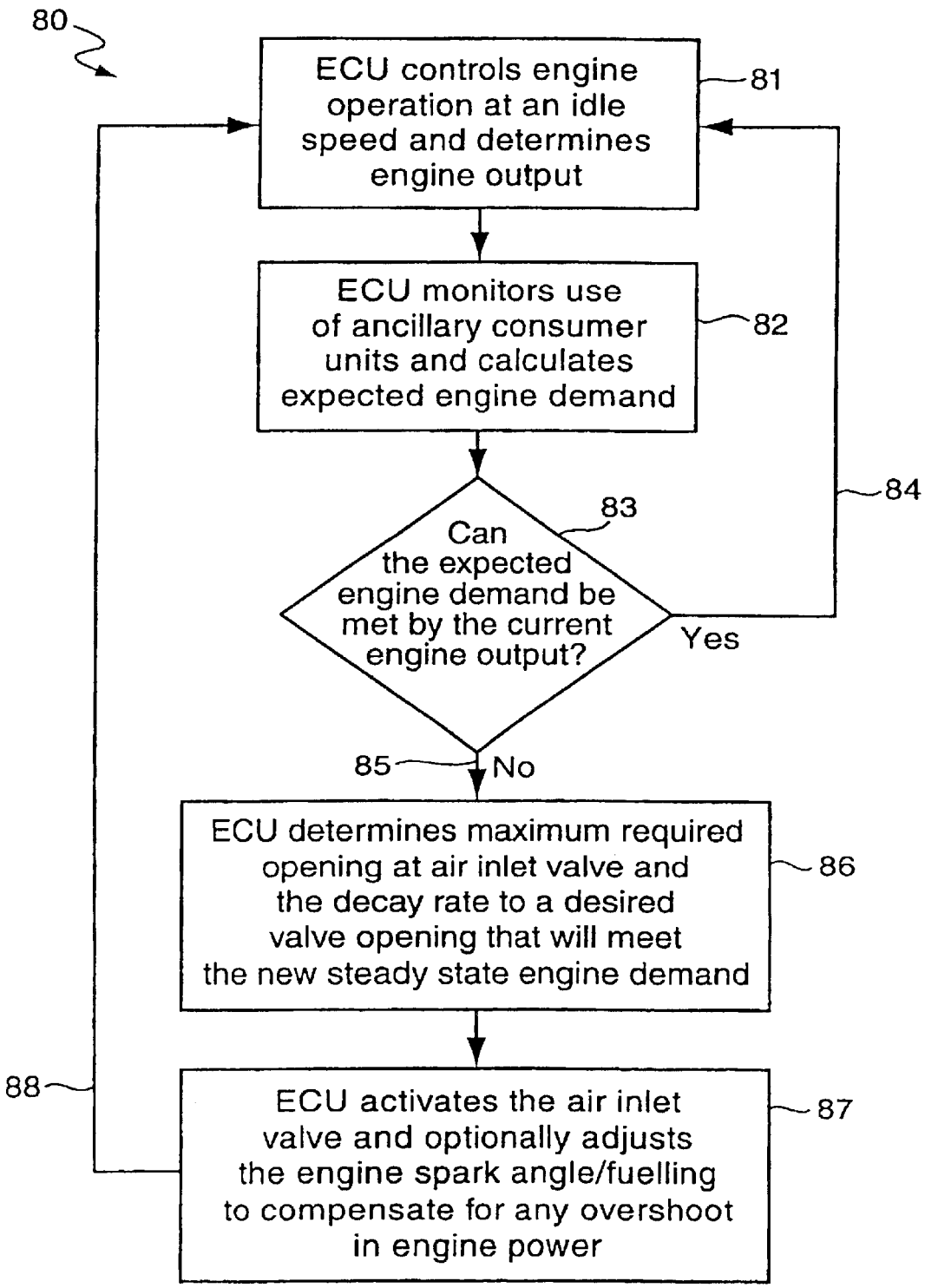
FIG. 5 is a flow chart depicting a method for controlling an internal combustion engine in a motor vehicle according to the invention.

The process described above is summarized in FIG. 5, which shows a flow chart 80. First, at 81, the ECU 15 controls engine operation at an idle speed and determines the engine output. The ECU 15 also monitors, at 82, use of ancillary consumer units and calculates an expected engine demand. The ECU 15 tests in 83 if the expected engine demand can be met by the current engine output. If so, then no action needs to be taken, and the ECU continues to control engine operation as before by returning at 84.

If, however, the engine demand cannot meet the expected demand, the process proceeds along 85 and the ECU 15 determines at 86 the maximum required opening of the throttle valve 21 and the decay rate to the desired valve opening, such that the engine power output will meet the new steady state engine demand. The ECU 15 then activates at 87 the throttle valve 21 accordingly, and optionally also adjusts also the engine spark angle and/or engine fueling to compensate for any overshoot in engine power. Then the ECU 15 continues along 88 to control engine operation as before.

The invention provides a number of advantages in terms of improved idle performance when ancillary consumer units may place a demand on engine power requiring an increase in engine power and hence engine speed and/or torque. Because the mass air flow responds more quickly, it is possible to use lower idling speeds than would otherwise be the case. At the same time, the invention provides improved compensation for load step changes imposed by ancillary units. Also, by achieving a steady state mass airflow quicker, larger gains can be used by any closed loop control of the throttle position, thereby improving further steady state idle engine speed control. In particular, an improvement up to 50% has been noted for systems using feed forward control response of the throttle valve.

It is to be recognized that various alterations, modifications, and/or additions may be introduced into the constructions and arrangements of parts described above without departing from the spirit or scope of the present invention, as defined by the appended claims.

What is claimed is:

1. A motor vehicle, comprising an internal combustion engine, an air inlet passageway in communication to aspirate the engine, an air inlet valve positioned in the passageway and being moveable to control air flow through the passageway to the engine, a valve actuator coupled for opening and closing the air inlet valve, at least one ancillary consumer unit powered by the engine, at least one engine sensor including an engine speed sensor, and an engine control unit that is operatively connected to the valve actuator, ancillary consumer unit and engine speed sensor in order to control engine operation, the engine control unit being arranged during idling of the engine:

(a) to monitor the operation of the ancillary consumer unit and to calculate an engine demand depending at least partly on the operation of the ancillary unit;
   (b) to monitor the engine idling speed and to determine if the expected engine demand can be met at the engine idling speed;
   (c) and when the engine demand exceeds that available at the engine idling speed, to determine a desired degree of opening of the air inlet valve to meet the expected engine demand;
   wherein when the engine demand exceeds that available at the engine idling speed, the engine control unit is arranged to open the air inlet valve to a position at which the steady state airflow would exceed that necessary to meet the expected engine demand, and to calculate an exponential decay factor and then to close the air inlet valve according to the calculated decay factor towards the desired opening so that the rate at which the engine control unit doses the air inlet valve varies in proportion with the monitored engine idling speed.

2. The motor vehicle according to claim 1, wherein the at least one ancillary unit is powered directly by the engine.

3. The motor vehicle according to claim 1, wherein the at least one ancillary unit is powered indirectly by the engine.

4. A method of controlling an internal combustion engine in a motor vehicle having an air inlet passageway, an air inlet valve positioned in the passageway, a valve actuator, at least one ancillary consumer unit, at least one engine sensor including an engine speed sensor, and an engine control unit that is operatively connected to the valve actuator, ancillary consumer unit and engine speed sensor, the method comprising the steps of:

i) aspirating the engine through the air inlet passageway while running the engine at an idling speed;
   ii) using the air inlet valve to control the air flow through the passageway to the engine;
   iii) using the valve actuator to control engine aspiration by opening and closing the air inlet valve;
   iv) powering the ancillary consumer unit directly or indirectly by the engine;
   v) using the engine control unit to monitor the operation of the ancillary unit and to calculate an engine demand depending at least partly on the operation of the ancillary unit;
   vi) using the engine control unit to monitor the engine idling speed and to determine if the expected engine demand can be met at the engine idling speed;
   vii) when the engine demand exceeds that available at the engine idling speed, using the engine control unit to determine a desired degree of opening of the air inlet valve to meet the expected engine demand;
   viii) when the engine demand exceeds that available at the engine idling speed, using the engine control unit to open the air inlet valve to a position at which the steady state airflow would exceed that necessary to meet the expected engine demand, and then to dose the air inlet valve towards the desired degree of opening; and
   ix) using the engine control unit to calculate an exponential decay factor and then in step viii) dosing the air inlet valve according to the decay factor so that the rate at which the engine control unit closes the air inlet valve varies in proportion with the monitored engine speed.

5. The method according to claim 4, wherein the decay rate for the calculated exponential decay factor varies inversely with the monitored engine speed.

6. The method according to claim 4, wherein the method further comprises the step of allowing the air flow to temporarily overshoot that necessary to meet the expected engine demand.

7. The method according to claim 6, wherein the engine is a spark ignition engine and the method includes the steps of:

using the engine control unit to initiate ignition with engine sparks at a desired engine spark angle; and
   using the engine control unit to steady engine power during the period when the air flow temporarily overshoots by varying the engine spark angle.

8. The method according to claim 4, wherein the degree to which the engine control unit initially opens the air inlet valve varies inversely with the monitored engine speed.

* * * * *

UNITED STATES PATENT AND TRADEMARK OFFICE
CERTIFICATE OF CORRECTION

PATENT NO.    : 6,895,928 B2
DATED         : May 24, 2005
INVENTOR(S)   : Adam P. Shepperson It is certified that error appears in the above-identified patent and that said Letters Patent is hereby corrected as shown below:

<u>Column 7,</u>
Line 52, after "unit" delete "doses" and substitute -- closes -- in its place.

<u>Column 8,</u>
Line 32, after "then to" delete "dose" and substitute -- close -- in its place.
Line 36, before "the air" delete "dosing" and substitute -- closing -- in its place.

Signed and Sealed this

Sixth Day of December, 2005

JON W. DUDAS
*Director of the United States Patent and Trademark Office*

UNITED STATES PATENT AND TRADEMARK OFFICE
CERTIFICATE OF CORRECTION

PATENT NO. : 6,895,928 B2 Page 1 of 1
APPLICATION NO. : 10/777931
DATED : May 24, 2005
INVENTOR(S) : Adam P. Shepperson It is certified that error appears in the above-identified patent and that said Letters Patent is hereby corrected as shown below:

Column 7,
Line 52, after "unit" delete "doses" and substitute -- closes -- in its place.

Column 8,
Line 32, after "then to" delete "dose" and substitute -- close -- in its place.
Line 36, before "the air" delete "dosing" and substitute -- closing -- in its place.

Signed and Sealed this

Twenty-seventh Day of June, 2006

JON W. DUDAS
*Director of the United States Patent and Trademark Office*